June 4, 1957 R. V. HARPER ET AL 2,794,758
METHOD AND APPARATUS FOR IN-PLACE LINING OF A PIPELINE
Filed Sept. 3, 1954

RICHARD V. HARPER
LAWRENCE B. WILDER
INVENTORS

BY
ATTORNEY

2,794,758
METHOD AND APPARATUS FOR IN-PLACE LINING OF A PIPELINE

Richard V. Harper, Casper, Wyo., and Lawrence B. Wilder, Tulsa, Okla., assignors to Pan American Petroleum Corporation, a corporation of Delaware Application September 3, 1954, Serial No. 454,167

5 Claims. (Cl. 154—82)

This invention pertains generally to the lining of pipelines, tubing, and the like to protect them from erosion, corrosion, from the deposition of solids on the surface, to reduce skin friction, to impermeabilize the walls, and the like. More particularly, this invention relates to the in-place lining of pipelines using tubular flexible plastic liners.

It has previously been recognized that steel pipelines are corroded and eroded by various corrosive and abrasive liquids and gases. It has also been recognized that finely divided solids, such as paraffin or combinations of paraffin and various inorganic salts, may be deposited on the walls of pipelines so that the fluid passage is substantially restricted. Various means including, for example, metallic coatings such as zinc and non-metallic coatings such as resinous paints, asphalt, cement, and the like have been proposed to line and protect these pipelines. It has been found that some of these internal coatings, including particularly the resinous coatings and liners, adequately protect pipelines, particularly steel pipelines from erosion and corrosion and often prevent the precipitation of solids on the surface but the placement of such liners has been inconvenient and uneconomical especially after a pipeline has been installed. That is, the lining of pipelines has generally regquired the dismantling of the line so that the sections could be lined individually and then reassembled.

Figure 1:
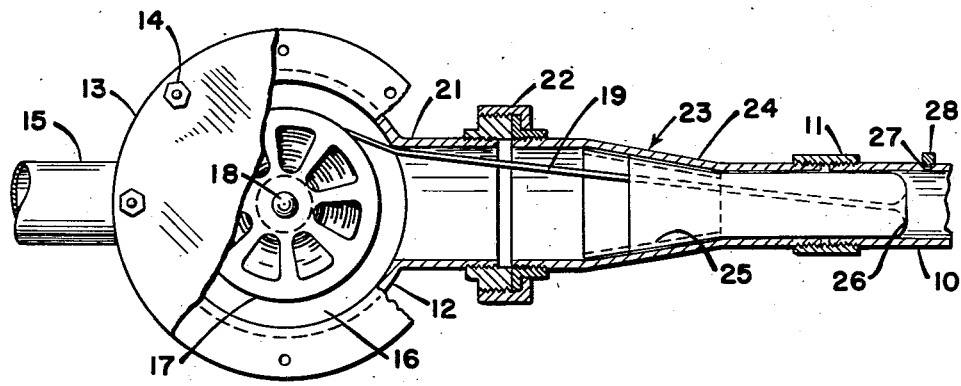
Figure 2:
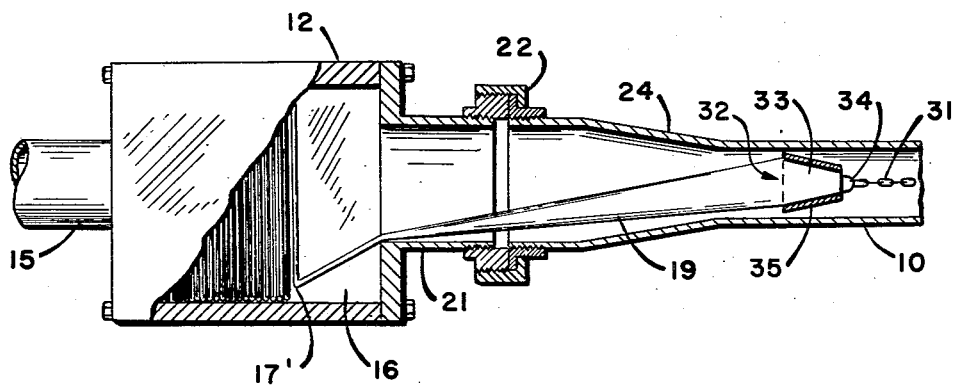

It is, therefore, an object of this invention to provide an improved method for in-place lining of pipelines. It is a more specific object of this invention to provide a method and apparatus for placing a flexible plastic liner in an installed pipeline. These and other objects of this invention will become apparent from the following description. In this description reference will be made to the accompanying drawings in which:

Figure 1 is a cross-sectional view of a preferred apparatus for installing a flexible plastic liner in an installed pipeline, and Figure 2 is a cross-sectional view of an alternate apparatus for installing a flexible plastic liner in an installed pipeline.

This invention thus in brief comprises an improved method and apparatus for placing a flexible plastic lining in an installed pipeline of great length. Referring now to Figure 1 of the drawings for a detailed description of a preferred embodiment of an apparatus for lining a pipe in situ, the end, preferably the upstream end, of the pipeline 10 which may be from a few feet to several thousand feet in length is shown. The pipeline may be constructed of any material. Examples of suitable materials are steel, wrought iron, aluminum, hydraulic cement, vitreous materials, etc. This pipeline which may be otherwise connected to a pipeline header or other fitting or which may be a segment of a previously installed pipeline is first disconnected from the attached header or line so that the lining apparatus can be attached to the coupling 11 which is preferably at the upstream end of the segment. This lining apparatus comprises a housing 12 having a closure plate 13 attached as by bolts 14 to the periphery of the housing. A fluid inlet line 15 from a pressure source such as a pump is connected to the housing for supplying a fluid such as water, oil or gas to the chamber 16 inside the housing 12. A reel 17 is mounted on the axle 18 within the housing. This reel contains a spooled tubular flexible plastic liner 19, the tube being collapsed on the reel so that the reel while small will hold several hundred feet of the liner. While the liner is preferably reeled on a spool as shown, obviously the liner could be folded or piled in an orderly staggered manner within the pressure chamber so that the liner could be automatically fed into the pipeline without tangling. "Reel" as the term is used herein therefore refers to all of these and equivalent means for storing a concentrated supply of the liner at the end of the pipeline. The liner is flexible, that is, it is capable of being folded without breaking. More particularly the term "flexible" as it is employed herein with reference to the liner, means that the liner can be folded substantially upon itself, i. e., bent at an angle of 180° and that the material therein will recover substantially completely without breaking. A flexible liner, as the term is employed herein and in the claims, thus refers to a tubing which can be turned through itself without destruction and without substantial over-stressing of the material. The material in the tube will withstand at least two double folds before severance on the M. I. T. Folding Endurance Tester at 1.0 kg. tension as prescribed in the Standard Folding Endurance Test, ASTM Designation D643–43 Method B, the specimen being cut in the axial or machine direction of the tube.

The material from which the flexible tube is made may comprise any of a number of the well-known plastics which have suitable folding properties and flexibility. The material is also compatible with, i. e., not dissolved or swelled appreciably by, the fluid to be handled. These include generally the vinyl plastics such as polyvinyl chloride, polyvinylidene chloride (saran), vinyl chloride acetate copolymers, vinyl nitrile, the styrene copolymers and co-copolymers such as polystyrene, the cellulosic plastics such as cellophane, cellulose acetate, cellulose acetate butyrate, ethyl cellulose, polythifluoromonochloroethylene (trithene), the coumarone-indene plastics, the polyamide, rubber and polyethylene plastics and the like, and fabrics impregnated with these materials. The plastics we have found most desirable for lining pipelines carrying petroleum and its derivatives are those which can be extruded into thin films that are very flexible and that are compatible with petroleum. These include cellulose acetate butyrate, ethyl cellulose, polyvinylidene chloride, vinylidene chloride copolymers, styrene-isobutylene copolymers, and particularly polythifluoromonochloroethylene. Polyethylene is particularly desirable due to its natural plasticity for lining pipelines carrying water and other compatible fluids.

The wall thickness of the tubular liner is not particularly critical except that where the plastic tends to be rather rigid, it may in some cases be made flexible under the above definition by making the tubing wall in a thin film. We have found that the wall thickness may be as thin as about 0.001 inch or less. In the preferred plastic compositions, including polyethylene and saran tubing, a thickness of between about 0.002 and 0.050 inch is preferred. Other materials which are more brittle and less flexible are generally limited to quite thin tubes, typically a wall thickness of 0.002–0.005 inch. Of course, these more brittle plastics in many cases may be made flexible by the addition of plasticizers or by increasing the temperature of the liner at the time it is installed so that it can be turned through itself without overstressing the material and causing it to leak.

The diameter and length of the liner may be varied depending upon the pipeline. The circumference of the liner is preferably smaller, typically 5-20%, than the circumference of the inside of the pipeline. Practically all of these plastics have an elongation transversely of 25% or greater so that the liner can be installed in a contracted state to facilitate placement and then it can be distended to fit the pipe by the application of pressure inside the liner. Liners of greater cross-sectional area sometimes tend to wrinkle in the pipeline and constrict flow. The length of the liner installed in the pipeline may be varied from a few feet to several miles, depending only upon the length of the pipeline, the length of the liner, the friction, the tensile strength of the liner, etc. We have found that when a lubricating fluid, typically water or a thin oil such as kerosene or crude oil, is used to displace the liner through the pipeline, the liner tends to move twice as fast as the fluid so that tension is maintained in the collapsed liner. A high tensile strength liner is accordingly preferred, particularly in a very long pipeline or where the liner is placed rapidly.

The housing 12 is connected via an outlet 21 through a union 22 to an upstream liner anchor 23. This anchor is then connected to coupling 11. The anchor includes a frustro-conical section 24 having a complementary frustroconical wedge 25. Other anchor means such as flanged couplings having a flared end of the tubular liner between the flanges may be substituted.

In operation the upstream liner anchor 23 is connected to the collar or coupling 11. The spool of flexible plastic liner is placed in the pressure chamber and the end is then drawn off of reel 17 through outlet 21 and through the frustro-conical wedge 25. The end of the liner is then stretched back over the wedge with the end of the liner at the large diameter end of the wedge. The folded liner and wedge are then inserted into the upstream liner anchor 23 as shown in the drawing and the wedge is forced into position in the frustro-conical section 24 so that the end of the liner is peripherally anchored in the pipeline. The housing 12 is then connected by union 22 to the upstream liner anchor 23. A fluid, typically water, is then injected through pressure line 15. This fluid flows into the annular fold 26 forcing the fold to move through the pipeline 10. As the fluid is injected into the housing and into the inside of the liner behind the fold, the collapsed liner coming off the reel is lubricated by the fluid through the inside of the previously placed liner which is held against the inside surface of the pipeline 10 by the pressure on the fluid. Generally, only a very minor pressure, typically less than about 10 p. s. i., is required to displace the fold through the pipeline. This pressure of course depends upon the elevation changes in the pipeline, the nature of the bends traversed and upon the flexibility of the liner. In a flexible plastic liner of the preferred type which tends to "drape," i. e., does not hold its shape, practically no pressure is required on the displacing fluid.

As the fold 26 is displaced through the pipeline, the liner approximately fills the pipeline and displaces all fluids previously in the line ahead of the fold and away from the pipeline wall. In some cases, however, as for example at a high point in a pipeline, all of the fluid may not be displaced ahead of the fold and it may be trapped between the liner and the pipeline. In such cases, holes 27 are drilled along the pipeline and preferably tapped prior to installation of the liner. After the liner has been installed, pressure may be applied internally to the liner to distend it and displace or bleed the fluid from this annular space either through the holes 27 or around the unanchored downstream end of the liner. After the fluid has been displaced from this annular space, plugs 28 are placed in the holes 27 to seal this space so that the liner is held snugly against the inside wall of the pipeline. With the liner at least half in place, i. e., with the fold 26 at least halfway through pipeline 10, the union 22 may be disconnected and the housing 12, reel 17 and surplus liner 19 thereon may be removed. The end of the upstream liner anchor 23 may then be reconnected into the pipeline, the header or the like. The downstream end of the liner may be left disconnected or it may obviously be connected into an anchor of the type used on the upstream end. An anchor for the downstream end of the liner is particularly desirable when the pipeline is used for flowing fluids in both directions.

While a flexible liner is preferably placed in a pipeline by reversing the liner through itself as above described, it will be apparent that other means may be employed. As shown in Figure 2 a steel cable 31 or the like may be threaded through a pipeline by attaching the cable to a piston such as a pipeline cleaner, scraper or swab and pumping the piston through the pipeline. The cable is then attached at one end to a fitting 32 comprising a center frustro-conical member 33 having a cable connector 34 at the small end. The reel 17' is placed in the housing 12 and the end of the tubular liner is pulled out the outlet 21. The end is then placed over the center member of the pulling fitting and the ring 35 is pressed on over the end of the tube. The union 22 is then made up to connect the housing to the pipeline so that the cable may be pulled through the pipeline to place the liner. Obviously the pulling fitting may be attached directly to a suitable piston such as a pipeline cleaner so that the fitting may be driven through the pipeline by hydraulic pressure or a fluid introduced through fluid inlet line 15. In either case, however, a lubricating fluid, desirably a liquid, is pumped through the pipeline with the liner as the liner is placed. When the liner is in place the ends may be anchored and the annular space between the liner and pipe evacuated as above described.

After the liner is placed and a high pressure fluid is pumped through it, the liner appears generally to conform to the inside contour of the pipeline. In some cases however, particularly where a downstream anchor is not employed and where the downstream end of a section of liner merely laps inside the adjacent downstream liner, the outside of the liner may be coated with an adhesive or cement so that the liner will be held in place permanently once it is placed and expanded.

The invention is thus susceptible of a wide variety of embodiments and is not to be construed to be limited to the apparatus and process above described. It should instead be construed to be limited only by the scope of the appended claims.

We claim:

1. A process for in-place lining of a pipeline comprising mounting a reeled flexible tubular plastic liner in a pressure chamber connected to one end of said pipeline, peripherally connecting one end of said liner to said end of said pipeline, subsequently injecting a fluid into said pressure chamber to place and distend said liner in said pipeline, and peripherally connecting the other end of said liner to said pipeline to seal the annular space between said liner and the inside wall of said pipeline.

2. A method according to claim 1 including bleeding fluid from said annular space between said liner and the inside wall of said pipeline and sealing said annular space.

3. A method according to claim 1 including cementing said liner to said inside wall.

4. An apparatus for in-place lining of a pipeline including a liner anchor connected to one end of said pipeline, a housing connected to said anchor, a reel of tubular flexible plastic liner within said housing, means to attach the end of said liner peripherally to said anchor and means to inject fluid into said housing and displace said liner through said pipeline.

5. An apparatus for lining a pipeline including a frustroconical anchor in the upstream end of said pipeline, a housing enclosing a pressure chamber connected to said anchor, a reel of tubular flexible plastic liner mounted in said pressure chamber, means to wedge one end of said tubular liner peripherally into said anchor, and means to inject fluid into said housing and displace said liner through said pipeline while said end of said liner is anchored.

References Cited in the file of this patent

UNITED STATES PATENTS

| | | |
|---|---|---|
| 642,537 | Thoma | Jan. 30, 1900 |
| 642,539 | Thoma | Jan. 30, 1900 |
| 1,721,838 | Semon et al. | July 23, 1929 |
| 2,027,961 | Currie | Jan. 14, 1936 |
| 2,290,333 | Johnson | July 21, 1942 |
| 2,608,501 | Kimble | Aug. 26, 1952 |
| 2,664,373 | Reilly | Dec. 29, 1953 |
| 2,695,255 | Avery | Nov. 23, 1954 |